United States Patent [19]
Kasik et al.

[11] 3,917,854
[45] Nov. 4, 1975

[54] CHEESE EXTENDER

[75] Inventors: Robert L. Kasik, Berwyn; Marvin A. Peterson, Park Ridge, both of Ill.

[73] Assignee: Beatrice Foods Company, Chicago, Ill.

[22] Filed: Mar. 27, 1974

[21] Appl. No.: 455,510

[52] U.S. Cl. ............ 426/573; 426/582; 426/585; 426/602; 426/613; 426/653; 426/656
[51] Int. Cl.² .................................. A23C 19/12
[58] Field of Search .......... 426/167, 188, 189, 186, 426/350, 360, 361, 362, 364; 260/119, 120

[56] References Cited
UNITED STATES PATENTS

| | | | |
|---|---|---|---|
| 2,161,401 | 6/1939 | Doering et al. | 426/361 X |
| 2,401,919 | 6/1946 | Ender | 260/119 |
| 3,040,018 | 6/1962 | Wingerd | 260/120 |
| 3,635,737 | 1/1972 | Baron | 426/188 |

*Primary Examiner*—Raymond N. Jones
*Assistant Examiner*—R. A. Yoncoskie
*Attorney, Agent, or Firm*—Cushman, Darby & Cushman

[57] ABSTRACT

A cheese extender comprised of a congealed mixture of a particular neutralized casein, fat and water. The weight ratios of neutralized casein to fat are from 1:2 to 2:1 and the weight ratios of water to the combination of neutralized casein and fat are from 1:2 to 3:1. The ingredients are heated to at least partially solvate the neutralized casein and then cooled to form the congealed mixture which closely resembles mozarella cheese in texture, mouth-feel and blandness.

22 Claims, No Drawings

CHEESE EXTENDER

The present invention relates to a cheese substitute and/or extender and method for production and use thereof. More particularly, the invention relates to a cheese substitute and/or extender which, when heated, exhibits the property of stringing similar to natural mozarella cheese.

BACKGROUND OF THE INVENTION

In the last fifteen years, the per capita consumption of Italian style cheese has increased approximately tenfold. While there has been a significant increase in the consumption of traditional Italian style cheeses, such as romano, parmesan and ricotta, by far the most dramatic increase in United States consumption of Italian style cheese has been in connection with mozarella. This has been due to the unusually rapid popularization of pizza in the United States. Mozarella cheese is, by far, the most dominant cheese used in producing pizza, with provolone cheese constituting the next most significant pizza cheese.

The amount of other cheeses used in the production of pizza has been relatively insignificant compared with the amount of mozarella cheese because of the unique stringy characteristic of heat plasticized mozarella cheese. Other types of cheese cannot produce this same stringy effect, and the consuming public will not, generally, accept a cheese pizza which does not exhibit the characteristic of stringiness. Additionally, the mozarella cheese has a distinctive and relatively clear taste which cannot be duplicated by other cheeses. Just as important, the clear taste does not override the taste of spices and other flavors used in pizza preparation, as is the case in other cheeses which have stronger and more lingering flavors. For example, while cheddar cheese or provolone cheese can produce some stringiness in a heated pizza, the flavors of these cheeses so override the flavors of the pizza spices that the consuming public does not, generally, accept these cheeses as substitutes for mozarella cheese.

The substantial increase in demand for mozarella cheese has not only caused difficulties in obtaining predictable supplies thereof, but has significantly increased the cost of the mozarella cheese. In view thereof, the art has sought means for supplementing or extending (or indeed replacing) the mozarella cheese used in pizza production wherein the desired characteristics of the mozarella cheese, as discussed above, are preserved. However, these efforts have met with only partial success. Such supplements or extenders have not been able to accurately reproduce the stringy characteristic of mozarella cheese and/or they have undesired flavors. Additionally, since the relatively bland and clear flavor of mozarella cheese has not been accurately reproduced, the supplements or extenders often either mask the pizza spice flavors or overwhelm the mozarella cheese flavor.

For the foregoing reasons, prior available supplements or extenders for mozarella cheese have not enjoyed substantial commercial success and have not been generally acceptable to the consuming public. It would, therefore, be most advantageous to produce a supplement or extender for mozarella cheese which preserves the appearance, texture and character of the mozarella cheese but does not adversely affect the flavor of a pizza produced therefrom.

OBJECTS OF THE INVENTION

It is, therefore, an object of the present invention to provide a mozarella cheese supplement or extender which can be used in major amounts with, or totally replace, the mozarella cheese used in producing pizza and other food products. It is a further object of the invention to provide such extenders wherein the stringy characteristic of the mozarella cheese is preserved. It is yet a further object of the invention to provide such products wherein the flavor of the extender does not mask or override the pizza spice flavors. It is yet a further object of the invention to provide such an extender in a very convenient-to-use form, which can be easily transported, stored, and utilized. It is a further object of the invention to provide methods for producing such extenders. Lastly, it is an object of the invention to provide methods of use for such extenders and foods containing the extenders. Other objects will be apparent from the following disclosures and claims.

BRIEF DESCRIPTION OF THE INVENTION

Very briefly stated, it has now been discovered that a congealed (gelled) mixture of a particular neutralized casein, fat and water can produce a mozarella cheese extender which provides the stringy characteristic of mozarella cheese and is of such flavor that the pizza spices and the mozarella cheese flavor are not masked by the extender. Further, when the cheese extender has a cheese-like flavor incorporated therein, the extender can be substituted either in major amounts or totally for the mozarella cheese used in making pizza.

The neutralized casein is produced from acid casein which has been neutralized in such a manner that the objectionable taste and mouthfeel of conventional acid casein are eliminated. Further, the neutralized casein has been neutralized in such a manner that it functions to congeal the mixture thereof with fat and water to produce a gelled stringy material which mimics the physical characteristics of mozarella cheese. Indeed, the present extender has moisture, protein, fat and ash contents quite similar to mozarella cheese. The composition may also contain conventional additives, such as coloring agents, flavoring agents, vitamin and mineral supplements, preservatives, and the like.

DETAILED DESCRIPTION OF THE INVENTION

The present mozarella cheese extender must be a congealed mixture (as more fully explained hereinafter) of a bland and gellable neutralized casein, fat and water.

The neutralized casein is prepared by the method of copending application Ser. No. 455,511 filed on Mar. 27, 1974, entitled BLAND NEUTRALIZED CASEIN, the entire disclosure of which is incorporated herein by reference and relied upon. The essential steps of the preferred process of the copending application are as follows. Casein is neutralized with a magnesium or potassium base (or precursor thereof) in such a manner that the resulting neutralized casein does not include the objectionable flavor and consistency components normally associated with conventionally neutralized caseinates, such as sodium and calcium caseinates. To accomplish this result, the casein is dispersed in hot water and sufficient base is added, or vice-versa, to reach a pH of 6.0 to 8.5, especially about 6.8 to 7.2, e.g., 7.1. However, care should be taken when operating at the higher pH ranges, e.g. at 8.3 or higher, that no substantial amounts of undissolved base remain in the hot water. Thereafter, the solids are separated from the mother liquid e.g., by drying, filtering or centrifuging.

The casein is obtained by coagulation of commercially available acid casein in a hot, non-toxic salt solution at temperatures of about 150°F to about 210°F. Any non-toxic salt may be used, but magnesium or potassium salts are preferred, e.g. a halide, nitrate, nitride, sulfide, sulfate, etc. Magnesium halide, e.g. magnesium chloride, is the most preferred. After draining the mother liquid, the coagulated curd may be washed one or more times, but this is not required.

The curd is then suspended in heated water, e.g. about 100°F. to about 210°F, and a magnesium or potassium base is added. The magnesium or potassium base may be any non-toxic base or precursor thereof. However, an oxide or hydroxide is preferred. Sufficient base is added to produce a pH of 6.0 to 8.5, as noted above. The neutralized mixture is homogenized with a high speed stirrer, and then dried, e.g. spray dried (e.g., 290°F to 300°F gas inlet/170°F to 190°F gas outlet), to produce the neutralized casein. Thus, for purposes of the specification and claims, the terms "neutralized casein" are defined as magnesium or potassium neutralized casein having a pH between 6.0 and 8.5.

The neutralized casein must be bland to the taste in order to not interfere with the cheese and/or pizza flavor. In this regard, sodium and calcium caseinates so interfere with the flavor and so produce unwanted flavors, that these are not equivalents for the present magnesium or potassium neutralized casein.

The fat which is used to produce the present mozarella extender may be any relatively low melting point vegetable or animal fat, so long as the fat has essentially a bland taste and is a liquid at a temperature of less than 130°F. (melting point of less than 130°F.). Preferably, the melting point is between 20°F. and 130°F., e.g. between 40°F. and 125°F., or between 50°F. and 120°F. However, since some animal fats, especially butter fat, are more difficult to preserve, the preferred form of the invention is the use of vegetable fat such as derived from coconuts, soybeans, safflower, corn, cotton, etc.

The relative proportions of neutralized casein to fat, as can be appreciated, are such that the ingredients will form a gel and, in combination with natural mozarella cheese, will preserve the stringy characteristic of the mozarella cheese.

Thus, in order to mimic the stringy characteristic of mozarella cheese, the weight to weight ratio of neutralized casein to fat must be between 2:1 and 1:2 and best results are obtained when this ratio is between 1:1.5 and 1.1:1, e.g., 1:1.

Also, in order to provide the stringy characteristic, the extender must have substantial amounts of water incorporated in the congealed mixture. The weight to weight ratio of water to the neutralized casein/fat combination must be within 1:2 to 3:1, especially 1.5:1 to 1:1.5, e.g. 1.25:1 to 1:1.25, and particularly 1:1.

The remainder of the ingredients of the present extender can be as desired. However, the combination of neutralized casein and fat should comprise at least 50% of the total solids of the extender composition, preferably at least 60% to 75%, and more preferably at least 90% to 92%. The remaining ingredients can be conventional flavorings, certified food colorings, preservatives, etc., such as salt, lactic acid or lactates, butter oils, especially lipolyzed butter oils, colorants, such as titanium dioxide or carotene.

It is also an important feature of the present invention that the extender can be produced, packaged, stored, and shipped in a dried form, i.e. without the necessary water, and the water can be added just prior to reconstituting the dry extender ingredients for use with mozarella cheese. This saves considerably on the difficulty and expense of transporting and storing the present extender as opposed to naturally produced mozarella cheese which must be transported and stored under refrigerated conditions. For this purpose, in a dried form means that the composition is dried until it has a water content of less than 10% by weight, e.g., less than 8% or even 6%.

The dry extender ingredients may be prepared by forming a suspension or emulsion of the neutralized casein and fat, along with desired optional ingredients as noted above, and then drying, e.g., spray drying (1500 psig nozzle pressure, 290°F. inlet, 190°F. outlet) to a free-flowing, non-sticky powder. Alternately, the dry ingredients and fat can simply be mechanically mixed, e.g. a Votator mixer. Thus, considerable latitude can be utilized in preparing the extender.

Alternately, the ingredients, i.e. neutralized casein, fat and optional ingredients may be stored separately and mixed just prior to gelling the ingredients with water for incorporation with mozarella cheese.

If desired, mozarella cheese may be added to either of the above described dry mixtures. Of course, if the mozarella cheese is added in the natural form, the dry compositions will no longer be storage stable. If it is desired to produce a storage stable composition with mozarella cheese therein, the composition with the natural cheese (or just the cheese) can be spray dried and the entire spray-dried composition reconstituted with water and gelled just prior to use in pizza production.

The extender may totally replace the natural mozarella cheese in food compositions, e.g. pizza, but it is preferred that the extender, if not artifically flavored, be used in ratios between 1:10 and 10:1 with natural cheese (on a solids basis). Good mixtures in this regard will be between 1:5 and 5:1, especially 1:2 and 2:1, i.e. 1:1.

It should be understood that the present composition, when prepared for immediate use, as opposed to in the dry form, is a congealed mixture of the defined neutralized casein, fat and water. In this context, the term "congealed" is defined as a homogeneous mixture with no visibly detectible different phases, i.e., the water, casein and fat are not in visibly, discernably different phases. Accordingly, it is clear that the term does not include a simple mechanical mixture of the ingredients, and indeed the composition is best described as a gel. While not bound by theory, it appears that the present particular neutralized casein is sufficiently solvated by the water to act as a semisolid emulsifier for the fat and water, i.e., it is gellable. Thus, the neutralized casein used in the practice of this invention must be capable of producing a gel of the described ingredients.

The neutralized casein appears to far more rapidly solvate at elevated temperature, which allows the required gel formation to be more rapidly produced. Therefore, the neutralized casein should be mixed with the fat and water at temperatures of at least 120°F., especially at least 150°F. Temperatures up to 212°F. or higher may be used but at these temperatures the neutralized casein can begin to denature. Thus, it is preferred that the mixing be at temperatures of less than 205°F., especially less than 185°F. or 190°F. A preferred temperature is 180°F.

On cooling, e.g., below 95°F, especially below 80°F, the heated mixture of the neutralized casein, fat and water congeals to form the gel-like solid. The cooled and congealed mixture has the physical appearance and properties of mozarella cheese, i.e. somewhat elastic, or rubbery, a coherent feel in the mouth, meltable and heat plasticizable to a stringy character. At cooler temperatures, e.g., 75°F or 60°F or less, these characteristics are accentuated. Thus, for improved grating, temperatures between 40°F and 55°F may be used.

The particular neutralized casein used in the composition is therefore critical to the invention. The neutralized casein must be so gellable that the congealed ingredients produce the stringy character and mouth feel of mozarella cheese. Also, the neutralized casein must be so bland as to not adversely affect the flavor of the gelled ingredients. Further, the neutralized casein must have the ability to produce such a gel within acceptable ratios of the present particular neutralized casein to the other necessary ingredients or optionally included ingredients. In this latter regard, certain optional ingredients are noted hereinbefore, but it should also be appreciated to conventional food "fillers" and "bulking agents" may also be used, including conventional acid casein and caseinates, but the conventional casein and caseinates are not embraced by the term "bland and gellable neutralized casein" as defined above. Any of the conventional caseins or caseinates, e.g. acid casein, sodium caseinate, potassium caseinate, or calcium caseinate may be used as "fillers" and "bulking agents".

The invention will be illustrated by the following examples, but it is to be understood that the invention is not limited to the specific examples but extends to the breadth described above.

EXAMPLE I

Production of a Neutralized Casein

Into a steam-heated jacketed mixing tank were placed 865 pounds of water and 10 pounds of magnesium chloride. With heating and stirring, the resulting solution reached a temperature of approximately 200°F. Thereafter, with vigorous stirring, were slowly added 125 pounds of commercial acid casein on a solids basis and the mixture was stirred for approximately three minutes while maintaining the temperature near 200°F. The stirring was then stopped. A coagulum formed and rose to the top of the liquid, forming a curd of bread-dough-like consistency. The pH of the curd was approximately 4.5. The curd was off-white in color, and it was apparent from the appearance, consistency and taste of the curd that significant amounts of undesired components and flavors had been removed. The jacket of the tank was heated to temperatures of approximately 220°F. and the bottom outlet of the tank was opened to drain the mother liquid.

300 pounds of the curd (containing 120 pounds of casein solids) were resuspended in 300 pounds of water heated to 140°F. With stirring the curd disintegrated into a coarse slurry.

Magnesium oxide was added to this slurry and the pH was monitored. After about one-half hour, the pH of the liquid and curd was approximately 7.0. About 1.6 pounds of magnesium oxide per 100 pounds of curd had been added to provide this pH. The slurry was then passed through a Matin-Gaulin homogenizer operated at 500 psig and spray dried in a conventional box spray drier with an inlet temperature of about 300°F. and an outlet temperature of about 185°F. The nozzle pressure of the spray drier was about 1500 psig.

The resulting dried neutralized casein powder was very white in color and had essentially no taste.

An analysis of the dried neutralized casein, on a dry basis, showed the following analysis:
Protein, 94.0%
Fat, 1.25%
Ash, 4.5%
Carbohydrate, less than 0.05%
The analysis also showed 1.25% magnesium.

Ten milliliters of a 5% solution of the product was dialyzed against one liter of a doubly deionized water for 72 hours, using a cellulose dialyzer tube (Fisher Scientific Company). This membrane retains materials with molecular weights of 12,000 and higher, and has an average pore diameter of 4.8 millimicrons. The dialyzed sample was dried under vacuum at room temperature and the quantity of magnesium was determined by atomic absorption using the Perkin-Elmer's method and showed that after dialysis the magnesium content in the sample was only about $5 \times 10^{-3}\%$. The loss of magnesium on dialysis shows that the magnesium is not tied to the larger protein molecule, but is free to be removed by passing through the membrane.

EXAMPLE II

Mozarella cheese extender was prepared in the following manner.

Twenty-two parts of hydrogenated soybean oil (95°F. melting point) were heated to 180°F.; 0.25 parts of lipolyzed butter oil and 0.05 parts of titanium dioxide were added with stirring to the hot oil. To this mixture was added 25 parts of the spray-dried neutralized casein of Example I. With stirring the neutralized casein was dispersed in the hot fat. 49 parts of water were heated to 160°F. and then added thereto were 2 parts of salt, 1.5 parts of lactic acid (88%) and 0.3 parts of sodium lactate (50%) and coloring.

With steady agitation, the water mixture was added to the fat-protein dispersion and a homogeneous mixture was produced (no free fat or water) in about 4 to 5 minutes. The hot product was poured into 5-pound loaf molds and cooled to 50°F. where a firm product resulted. The cooled product had the consistency, feel and general appearance of mozarella cheese, although the flavor was exceptionally bland.

EXAMPLE III

Preparation of Cheese Pizza

Traditional pizza dough was prepared by mixing flour, salt, solid vegetable shortening, scalded milk and dried yeast. The dough was allowed to raise in the conventional manner and rolled into an unbaked pizza crust. The crust was lightly brushed with olive oil and traditional pizza sauce was placed thereon. The sauce was prepared by mixing mascerated tomatoes, minced garlic, minced onion, olive oil, oregano, freshly ground black pepper and red pepper flakes. Onto the pizza sauce was placed a mixture of grated mozarella cheese and the product of Example II in a similar grated form. The weight ratio of the mozarella cheese and the product of Example II was 1 to 1.

Thereafter, the pizza was baked at 420°F. for 20 minutes. The cheese of the baked pizza was white, of a milky translucent appearance and when pulled, stringed in a manner essentially the same as mozarella cheese.

As a comparison, a pizza was prepared in the same manner as described above, except that the extender of Example II was not used, and the corresponding amount of natural mozarella was used in its place. The allmozarella cheese pizza could not be distinguished from the pizza with the present extender in terms of its appearance, stringiness, or other physical characteristics.

EXAMPLE IV

Example II was repeated except that the extender had incorporated therein a mozarella cheese flavor produced according to the method of U.S. Pat. No. 3,667,968, in an amount of 15% by weight of the extender. In this case, the flavor, as well as the physical characteristics of the pizza produced with the extender was essentially indistinguishable from the pizza produced with all mozarella cheese.

EXAMPLE V

Example III was repeated except that the extender of Example II was produced from a neutralized casein, according to Example I, except that potassium chloride and potassium oxide were used instead of magnesium chloride and magnesium oxide, respectively. The pizza did not string as well as that of Example III but the stringiness was acceptable. The taste was acceptable, but not as true as that of Example III.

What is claimed is:

1. A cheese extender composition comprising a congealed mixture of: essentially magnesium neutralized casein or potassium neutralized casein or a mixture of magnesium and potassium neutralized casein; a fat having a melting point of 130°F. or less; and water; wherein the weight ratio of the neutralized casein to fat is from 1:2 to 2:1 and the weight ratio of water to the combination of neutralized casein and fat is from 1:2 to 3:1, whereby the composition exhibits the stringy characteristic, texture, mouth-feel and blandness similar to that of natural mozarella cheese.

2. The composition of claim 1 having admixed therewith an artifical mozzarella cheese flavor.

3. The composition of claim 1 wherein the ratio of water to the combination of fat and neutralized casein is between 1.5:1 and 1:1.5.

4. The composition of claim 1 wherein the ratio of casein to fat is between 1.5:1 and 1:1.5.

5. The composition of claim 1 wherein the fat has a melting point between 20°F. and 130°F.

6. The composition of claim 1 wherein the combination of neutralized casein and fat constitute at least 50% by weight of the solids content of the composition.

7. The composition of claim 6 having admixed therewith a flavoring or coloring agent.

8. The composition of claim 1 in a dried form containing less than 10% by weight of water.

9. The composition of claim 1 having admixed therewith a natural cheese.

10. The composition of claim 9 wherein the natural cheese is mozarella cheese.

11. The composition of claim 10 in a dried form containing less than 10% by weight of water.

12. A composition comprising magnesium or potassium neutralized casein and a fat having a melting point of 130°F or less; the weight ratio of the neutralized casein to fat being 1:2 to 2:1, and wherein the composition is reconstitutable with water in weight ratios of water to composition of between 1:2 to 3:1 to provide a congealed mixture having properties siimlar to natural mozarella cheese.

13. A process for producing the product of claim 1 comprising:
  a. mixing at a temperature of at least 120°F magnesium or potassium neutralized casein, a fat having a melting point of 130°F or less and water; the weight ratio of the neutralized casein to fat being from 1:2 to 2:1 and the weight ratio of water to the combination of neutralized casein and fat being from 1:2 to 3:1; and
  b. cooling the mixture to a temperature below 95°F to congeal the mixture.

14. The composition of claim 1 wherein the neutralized casein is essentially magnesium neutralized casein.

15. The composition of claim 5 wherein the fat is a vegetable fat.

16. The composition of claim 6 wherein the casein and fat constitute at least 75% by weight of the solids content of the composition.

17. The composition of claim 9 wherein the amount of the composition admixed with natural cheese is within the ratio of 1:10 to 10:1.

18. The composition of claim 17 wherein the ratio of composition to natural cheese is 1:5 to 5:1.

19. The composition of claim 1 wherein the composition also contains either lactic acid or sodium lactate.

20. The composition of claim 12 wherein the composition contained lactic acid or sodium lactate.

21. The composition of claim 12 in a spray-dried form.

22. The spray-dried composition of claim 21 having admixed therewith either lactic acid, sodium lactate or sodium chloride.

* * * * *